US006333119B1

(12) United States Patent
Mito et al.

(10) Patent No.: US 6,333,119 B1
(45) Date of Patent: *Dec. 25, 2001

(54) ADHESIVE COMPOSITION AND ADHESIVE COMPOSITION-APPLIED LAMINATE

(75) Inventors: Masaharu Mito, Iwakuni; Mikio Nakagawa, Hiroshima-ken, both of (JP)

(73) Assignee: Mitsui Chemicals INC, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,563

(22) Filed: Apr. 9, 1999

Related U.S. Application Data

(63) Continuation of application No. 08/095,992, filed on Jul. 21, 1993, now abandoned, which is a continuation of application No. 07/862,372, filed on Apr. 2, 1992, now abandoned.

(30) Foreign Application Priority Data

Apr. 2, 1991 (JP) .................................................... 3-95019

(51) Int. Cl.⁷ ............................. B32B 27/10; B32B 27/32
(52) U.S. Cl. ............................................................ 428/511
(58) Field of Search ........................... 525/74, 222, 240; 428/511

(56) References Cited

U.S. PATENT DOCUMENTS

| | | | |
|---|---|---|---|
| 4,339,507 | 7/1982 | Kurtz et al. | 525/222 |
| 4,394,485 | 7/1983 | Adur | 525/74 |
| 4,460,632 | 7/1984 | Adur et al. | 525/74 |
| 4,487,885 | 12/1984 | Adur et al. | 525/74 |
| 4,684,576 | 8/1987 | Tabor et al. | 525/74 |

FOREIGN PATENT DOCUMENTS

| | | |
|---|---|---|
| 0052889 | 6/1982 | (EP) . |
| 0091807 | 10/1983 | (EP) . |
| 0188901 | 7/1986 | (EP) . |
| 61-162539 | 7/1986 | (JP) . |
| 62-25139 | 2/1987 | (JP) . |

*Primary Examiner*—Peter Szekely

(57) ABSTRACT

A adhesive composition comprising (A) a substantially linear, low-density polyethylene,
(B) a high pressure low-density polyethylene,
(C) an ethylene-based polymer modified with an unsaturated carboxylic acid or a derivative thereof, the ethylene-based polymer being an ethylene homopolymer or a random copolymer formed from ethylene and an α-olefin other than ethylene in which the α-olefin makes up not more than 10 mol % based on the total molar amount of the ethylene and the α-olefin, and
(D) a tackifier, the amount of each of Components (A), (B), (C) and (D) being respectively 30 to 80% by weight, 1 to 50% by weight, 1 to 30% by weight and 1 to 30% by weight, based on the total amount of Components (A), (B), (C) and (D). The adhesive composition may further contain an ethylene/α-olefin random copolymer as Component (E) in an amount of not more than 30% by weight based on the total amount of Components (A) to (D) and (E). This adhesive composition has improved adhesion properties particularly to paper.

8 Claims, No Drawings

ADHESIVE COMPOSITION AND ADHESIVE COMPOSITION-APPLIED LAMINATE

CROSS-REFERENCE TO RELATED APPLICATIONS

This application is a continuation of application Ser. No. 08/095,992, filed Jul. 21, 1993 now abandoned; which in turn is a continuation of application Ser. No. 07/862,372, filed Apr. 2, 1992 now abandoned.

DETAILED DESCRIPTION OF THE INVENTION:

The present invention relates to an adhesive composition and a laminate formed by the application of the adhesive composition. More specifically, it relates to an adhesive composition which exhibits excellent processability and adhesion properties particularly when a saponification product of an ethylene/vinyl acetate copolymer is laminated on paper, and a laminate formed by the application of the adhesive composition.

When a saponification product of an ethylene/vinyl acetate copolymer is laminated on paper, it is conventional practice to use a composition containing a substantially linear, low-density polyethylene and a modified ethylene polymer as an adhesive.

However, the above composition is insufficient in adhesion to paper, and it is being desired to improve its adhesion properties.

The formation of a laminate is industrially advantageously carried out by a method in which an adhesive composition and, for example, a saponification product of an ethylene/vinyl acetate copolymer are co-extruded in such a manner that a layer of the adhesive composition is brought into contact with paper, whereby the saponification product, the adhesive composition and the paper are combined in this order. However, the above composition is liable to cause necking or wavy edges (periodical changes in width and thickness of the extruded film). In particular, when the extrusion rate increases, these phenomena occur to a greater extent, and these problems remain to be solved.

It is an object of the present invention to provide an adhesive composition.

It is another object of the present invention to provide an adhesive composition having improved adhesion properties particularly to paper.

It is further another object of the present invention to provide an adhesive composition which exhibits improved extrusion processability, i.e., remarkable improvement in the degrees of necking and wavy edges when it is co-extruded, for example, together with a saponification product of an ethylene/vinyl acetate copolymer.

It is still further another object of the present invention to provide a laminate formed by the application of the adhesive composition of the present invention.

Other objects and advantages of the present invention will be apparent from the following description.

According to the present invention, first, the above objects and advantages of the present invention are achieved by an adhesive composition comprising (A) a substantially linear, low-density polyethylene, (B) a high pressure low-density polyethylene, (C) an ethylene-based polymer modified with an unsaturated carboxylic acid or a derivative thereof, the ethylene-based polymer being an ethylene homopolymer or a random copolymer formed from ethylene and an α-olefin other than ethylene in which the α-olefin makes up not more than 10 mol % based on the total molar amount of the ethylene and the α-olefin, and (D) a tackifier, the amount of each of Components (A), (B), (C) and (D) being respectively 30 to 80% by weight, 1 to 50% by weight, 1 to 30% by weight and 1 to 30% by weight, based on the total amount of Components (A), (B), (C) and (D).

The adhesive composition of the present invention comprises four components, Components (A) to (D), as specified above.

The substantially linear, low-density polyethylene as Component (A) preferably has a density of not more than 0.94 g/cm$^3$ and a melt index value of 1 to 50 g/10 minutes. This linear, low-density polyethylene is a copolymer formed from ethylene and an α-olefin, and the α-olefin content is not more than 10 mol %. The α-olefin is generally selected from those having 3 to 20 carbon atoms such as propylene, 1-butene, 1-hexene, 4-methyl-1-pentene, 1-octane and 1-decene.

The high pressure low-density polyethylene as Component (B) preferably has a density of not more than 0.93 g/cm$^3$ and a melt index value of 0.1 to 50 g/10 minutes.

The ethylene-based polymer as Component (C) is a product obtained by modifying an ethylene homopolymer or a random ethylene/α-olefin copolymer with an unsaturated carboxylic acid or a derivative thereof, the random ethylene/α-olefin copolymer being formed from ethylene and α-olefin other than ethylene in which the content of the α-olefin based on the total molar amount of ethylene and the α-olefin is not more than 10 mol %, preferably not more than 5 mol %.

Examples of the unsaturated carboxylic acid or the derivative thereof include unsaturated carboxylic acids such as acrylic acid, maleic acid, fumaric acid, tetrahydrophthalic acid, itaconic acid, citraconic acid, crotonic acid, isocrotonic acid and Nadic acid (endo-cis-bicyclo[2,2,1]hept-5-ene2,3-carboxylic acid); or derivatives thereof such as acid halides, amides, imides, anhydrides and esters. Specific examples of the above derivatives include malenyl chloride, maleimide, maleic anhydride, citraconic anhydride, monomethyl maleate, dimethyl maleate and glycidyl maleate. Of these, particularly preferred are unsaturated dicarboxylic acids or anhydrides thereof, and particularly preferred are maleic acid, Nadic acid or anhydrides of these.

The random ethylene/α-olefin copolymer before the modification is a random copolymer formed from ethylene and α-olefin other than ethylene, in which the content of the α-olefin based on the total molar amount of ethylene and the α-olefin is not more than 10 mol %.

The α-olefin other than ethylene is preferably selected from α-olefins having 3 to 20 carbon atoms such as propylene, 1-butene, 1-hexene, 4-methyl-1-pentene, 1-octene, 1-decene, 1-tetradecene and 1-octadecene. These α-olefins may be used alone or in combination.

The above α-olefin makes up not more than 10 mol %, preferably not more than 5 mol %, of the total molar amount of ethylene and the α-olefin which form the random copolymer.

When the amount of the α-olefin exceeds 10 mol %, undesirably, blocking occurs due to stickiness, and it is difficult to handle the copolymer.

The ethylene-based polymer modified with an unsaturated carboxylic acid or a derivative thereof as Component (C) is that which is graft-modified with preferably 0.05 to 15% by weight, more preferably 0.1 to 10% by weight, based on the ethylene-based copolymer before the modification, of an unsaturated carboxylic acid or a derivative thereof.

Further, the modified ethylene-based polymer as Component (C) preferably exhibits a melt flow rate (MFR), measured according to ASTM D1238 (190° C., a load of 2,160 g), of 0.1 to 50 g/10 minutes, and more preferably, 0.3 to 30 g/10 minutes.

The tackifier as Component (D) is preferably a solid amorphous polymer, and is selected from those which are usually used as a tackifier resin in the fields of adhesive tapes, coating compositions and hot melt adhesives.

The tackifier is exemplified as below depending upon a difference in monomer sources which are polymerized. For example, the tackifier includes aliphatic hydrocarbon resins formed mainly from $C_4$ fractions, $C_5$ fractions, mixtures of these, which are obtained by decomposition of petroleum and naphtha, e.g., isoprene and 1,3-pentadiene contained in $C_5$ fractions; aromatic hydrocarbon resins formed mainly from an styrene derivative and indenes contained in $C_9$ fractions obtained by decomposition of petroleum and naphtha; an aliphatic aromatic hydrocarbon resin obtained by copolymerization of a $C_9$ fraction and either or both of $C_4$ and $C_5$ fractions; an alicyclic hydrocarbon resin obtained by hydrogenation of an aromatic hydrocarbon resin; a synthetic terpene hydrocarbon resin having a structure containing aliphatic, alicyclic and aromatic moieties; a terpene hydrocarbon resin formed from α,β-pinenes contained in terpene oil; a cumarone-indene hydrocarbon resin formed from indene and styrenes contained in coal tar; a low molecular weight styrene resin; and a rosin hydrocarbon resin.

The adhesive composition of the present invention contains, based on the total amount of Components (A) to (D), 30 to 80% by weight of Component (A), 1 to 50% by weight of Component (B), 1 to 30% by weight of Component (C) and 1 to 30% by weight of Component (D).

When the amount of Component (B) is less than 1% by weight, no effect is produced on the prevention of necking and wavy edges. When it exceeds 50% by weight, the adhesion properties at high temperature decrease. The amount of Component (B) is preferably 1 to 30% by weight.

When the amount of Component (C) is less than 1% by weight, no adhesion properties are exhibited. Even though it exceeds 30% by weight, no adhesion properties are any further improved, and the economic efficiency therefore decreases.

When the amount of Component (D) is less than 1% by weight, no adhesion properties are exhibited. When it exceeds 30% by weight, the resultant composition is liable to cause blocking and therefore causes a problem in handling.

The adhesive composition of the present invention may further contain an ethylene/α-olefin random copolymer as Component (E) in addition to the above components. The amount of Component (E) based on the total amounts of Components (A) to (D) and (E) is preferably not more than 30% by weight.

The ethylene/α-olefin random copolymer (E) has the crystallinity of preferably not more than 30% by weight, more preferably 25% by weight.

The above α-olefin is selected from α-olefins having 3 to 20 carbon atoms. Examples of the α-olefin include 1-butene, 1-hexene, 4-methyl-1-pentene, 1-octene, 1-decene, 1-tetradecene and 1-octadecene. These α-olefins may be used alone or in combination.

The above α-olefin preferably makes up 5 to 55 mol %, more preferably 10 to 55 mol %, of the total molar amount of ethylene and the α-olefin which forms the random copolymer.

As an ethylene/α-olefin random copolymer, particularly preferred are, for example, an ethylene/propylene random copolymer and an ethylene/1-butene random copolymer.

The adhesive composition of the present invention shows adhesion, for example, to a high pressure low-density polyethylene (HPLDP), and in particular, it shows excellent adhesion properties to a saponification product of an ethylene/vinyl acetate copolymer and paper.

According to the present invention, therefore, there is advantageously provided a laminate which is formed of a layer of a saponification product of an ethylene/vinyl acetate copolymer, a layer of the adhesive composition of the present invention, and paper in this order.

The above laminate of the present invention can be industrially advantageously produced, for example, by co-extruding a saponification product of an ethylene/vinyl acetate copolymer and the adhesive composition of the present invention and, after the co-extrusion, combining the extrudate and paper. Since the adhesive composition of the present invention has excellent extrusion properties, it remarkably improves a laminate on the degrees of necking and formation of wavy edges.

The present invention will be detailed hereinafter by reference to Examples, which, however, shall not limit the present invention.

EXAMPLE 1

(1) 75 Parts by weight of substantially linear, low-density polyethylene (Ult-zex® 20100J, supplied by Mitsui Petrochemical Industries, Ltd.), 10 parts by weight of high pressure low-density polyethylene (Milason®11P, supplied by Mitsui Petrochemical Industries, Ltd.), 10 parts by weight of a tackifier (a petroleum resin, Arkon P125, supplied by Arakawa Chemical Industries, Inc.) and 5 parts by weight of high-density polyethylene graft-modified with maleic anhydride (density=0.96 g/cm$^3$, MFR=4 g/10 minutes, graft ratio=2 wt. %) were melted and mixed in an extruder at 200° C., and extruded to give pellets.

(2) The above-obtained composition (to be referred to as "MPE" hereinafter) and a saponification product of an ethylene/vinyl acetate copolymer (Eval EP-E105B, supplied by Kuraray Co., Ltd., to be referred to as "EVOH" hereinafter) were co-extruded with the following apparatus under the following forming conditions to form a laminate.

(Apparatus)

Two-layer extrusion laminator supplied by Sumitomo Heavy Industries, Ltd.

Extruders: For MPE, 65 mmφ, L/D=32
For EVOH, 65 mmφ, L/D=32

Black box: Rectangular tube converging method; converging angle 30 degrees; MPE side, straight; EVOH side, converging Die: Straight tear drop type manifold (Forming Conditions)

(1) Thickness structure: MPE/EVOH (EP-E105B) =10/30 μ.
(2) Object to be adhered: kraft paper, basis weight 50 g/m²
(3) Forming temperature: 230° C.
(4) Take up rate: 80 m/min.

The laminate was evaluated on the following items.

(1) Laminatability: degree of neck-in
(2) Adhesion properties:
  Paper/MPE T-peeling strength (300 mm/min)
  MPE/EVOH T-peeling strength (300 mm/min)

Table 1 shows the results.

EXAMPLE 2

Example 1 was repeated except that the amount of the substantially linear, low-density polyethylene was changed to 65 parts by weight and that the amount of the tackifier was changed to 20 parts by weight. Table 1 shows the results.

EXAMPLE 3

Example 1 was repeated except that the amount of the substantially linear, low-density polyethylene was changed to 55 parts by weight and that the amount of the high pressure low-density polyethylene was changed to 30 parts by weight. Table 1 shows the results.

Comparative Example 1

Example 1 was repeated except that the amount of the substantially linear, low-density polyethylene was changed to 85 parts by weight and that no high pressure low-density polyethylene was used. Table 1 shows the results.

Comparative Example 2

Example 1 was repeated except that the amount of the substantially linear, low-density polyethylene was changed to 85 parts by weight and that no tackifier was used. Table 1 shows the results.

TABLE 1

| | Ex. 1 | Ex. 2 | Ex. 3 | Com. Ex. 1 | Com. Ex. 2 |
|---|---|---|---|---|---|
| Substantially linear, low-density polyethylene (part by wt.) | 75 | 65 | 55 | 85 | 85 |
| Ethylene/α-olefin random copolymer (part by wt.) | 0 | 0 | 0 | 0 | 0 |
| High pressure low-density polyethylene (part by wt.) | 10 | 10 | 30 | 0 | 10 |
| Tackifier (part by wt.) | 10 | 20 | 10 | 10 | 0 |
| Modified ethylene polymer (part by wt.) | 5 | 5 | 5 | 5 | 5 |
| Adhesive strength (g/15 mm) | | | | | |
| Paper | 140 | 140 | 130 | 140 | 20 |
| EVOH | 350 | 370 | 280 | unpeelable | 140 |
| Remarks | | | | extraordinary neck-in, wavy edges, defective laminate appearance | |

EXAMPLE 4

(1) 65 Parts by weight of substantially linear, low-density polyethylene (Ult-zex® 20100J, supplied by Mitsui Petrochemical Industries, Ltd.), 10 parts by weight of an ethylene-propylene random copolymer (Tafmer P0280, ethylene 80 mol %, propylene 20 mol %, supplied by Mitsui Petrochemical Industries, Ltd.), 10 parts by weight of high pressure low-density polyethylene (Milason® 11P, supplied by Mitsui Petrochemical Industries, Ltd.), 10 parts by weight of a tackifier (a petroleum resin, Arkon P125, supplied by Arakawa Chemical Industries, Inc.) and 5 parts by weight of high-density polyethylene graft-modified with maleic anhydride (density=0.96 g/cm³, MFR=4 g/10 minutes, graft ratio=2 wt. %) were melted and mixed in an extruder at 200° C., and extruded to give pellets.

(2) Example 1(2) was repeated except for the use of the above-obtained pellets. Table 2 shows the results.

EXAMPLES 5–8 AND COMPARATIVE EXAMPLES 3–5

Adhesive compositions having the compositions shown in Table 2 were prepared in the same manner as in Example 1(1), and laminates were produced in the same manner as in Example 1(2). Table 2 shows the results.

TABLE 2

|  | Ex. 4 | Ex. 5 | Ex. 6 | Ex. 7 | Ex. 8 | Com. Ex. 3 | Com. Ex. 4 | Com. Ex. 5 |
|---|---|---|---|---|---|---|---|---|
| Substantially linear, low-density polyethylene (part by wt.) | 65 | 65 | 55 | 55 | 60 | 75 | 55 | 75 |
| Ethylene/α-olefin random copolymer (part by wt.) | 10 | 10*1 | 10 | 10 | 20 | 10 | 30*1 | 10 |
| High pressure low-density polyethylene (part by wt.) | 10 | 10 | 10 | 20 | 10 | 10 | 10 | — |
| Tackifier (part by wt.) | 10 | 10 | 20 | 10 | 5 | — | — | 10 |
| Modified ethylene polymer (part by wt.) | 5 | 5 | 5 | 5 | 5 | 5 | 8 | 5 |
| Adhesive strength (g/15 mm) | | | | | | | | |
| Paper | 160 | 120 | 180 | 160 | 120 | 20 | 20 | 130 |
| EVOH | unpeelable | unpeelable | unpeelable | unpeelable | unpeelable | 130 | unpeelable | unpeelable |
| Remarks | | | | | | | | extraordinary neck-in, wavy edges |

*1Ethylene-butene-1 random copolymer (Tafmer A-4085, ethylene 89 mol %, butene-1 11 mol %, supplied by Mitsui Petrochemical Industries, Ltd.)

What is claimed is:

1. A laminate comprising a layer of a saponification product of an ethylene/vinyl acetate copolymer and a layer of paper and an adhesive composition layer therebetween, wherein said adhesive composition consists essentially of (A) a substantially linear, low-density polyethylene in an amount of 30 to 80% by weight, (B) a high pressure low-density polyethylene in an amount of 1 to 50% by weight, (C) an ethylene-based polymer modified with an unsaturated carboxylic acid, anhydride or ester thereof in an amount of 5 to 30% by weight, the ethylene-based polymer being an ethylene homopolymer or a random copolymer formed from ethylene and an α-olefin other than ethylene in which the α-olefin makes up not more than 10 mol % based on the total molar amount of the ethylene and the α-olefin, (D) a tackifier in an amount of 1 to 30% by weight, based on the total amount of Components (A), (B), (C) and (D), and (E) an ethylene/α-olefin random copolymer in an amount of 0 to 30% by weight based on the total amount of Components (A) to (D) and (E).

2. A laminate according to claim 1, wherein said adhesive composition consists essentially of (A) a substantially linear, low-density polyethylene in an amount of 55 to 75% by weight, (B) a high pressure low-density polyethylene in an amount of 10 to 30% by weight, (C) an ethylene-based polymer modified with an unsaturated carboxylic acid, anhydride or ester thereof in an amount of 5 to 30% by weight, the ethylene-based polymer being an ethylene homopolymer or a random copolymer formed from ethylene and an α-olefin other than ethylene in which the α-olefin makes up not more than 10 mol % based on the total molar amount of the ethylene and the α-olefin, (D) a tackifier in an amount of 10 to 20% by weight, based on the total amount of components (A), (B), (C) and (D).

3. A method for preparing a laminate comprising a layer of a saponification product of an ethylene/vinyl acetate copolymer and a layer of paper which method comprises adhering said layer of saponification product of ethylene/vinyl acetate copolymer to the paper layer by providing an adhesive composition layer therebetween, wherein said adhesive composition consist essentially of (A) a substantially linear, low-density polyethylene in an amount of 30 to 80% by weight, (B) a high pressure low-density polyethylene in an amount of 1 to 50% by weight, (C) an ethylene-based polymer modified with an unsaturated carboxylic acid, anhydride or ester thereof in an amount of 5 to 30% by weight, the ethylene-based polymer being an ethylene homopolymer or a random copolymer formed from ethylene and an α-olefin other than ethylene in which the α-olefin makes up not more than 10 mol % based on the total amount of the ethylene and the α-olefin, (D) a tackifier in an amount of 1 to 30% by weight, based on the total amount of Components (A), (B), (C) and (D), and (E) an ethylene/α-olefin random copolymer in an amount of 0 to 30% by weight based on the total amount of Components (A) to (D) and (E).

4. The method of preparing a laminate according to claim 3, wherein said adhesive composition consists essentially of (A) a substantially linear, low-density polyethylene in an amount of 55 to 75% by weight, (B) a high pressure low-density polyethylene in an amount of 10 to 30% by weight, (C) an ethylene-based polymer modified with an unsaturated carboxylic acid, anhydride or ester thereof in an amount of 5 to 30% by weight, the ethylene-based polymer being an ethylene homopolymer or a random copolymer formed from ethylene and an α-olefin other than ethylene in which the α-olefin makes up not more than 10 mol % based on the total molar amount of the ethylene and the α-olefin, (D) a tackifier in an amount of 10 to 20% by weight, based on the total amount of Components (A), (B), (C) and (D).

5. A laminate comprising a layer of a saponification product of an ethylene/vinyl acetate copolymer and a layer of paper and an adhesive composition layer therebetween, wherein said adhesive composition comprising (A) a substantially linear, low-density polyethylene in an amount of 30 to 80% by weight, (B) a high pressure low-density polyethylene in an amount of 1 to 50% by weight, (C) an ethylene-based polymer modified with an unsaturated carboxylic acid, anhydride or ester thereof in an amount of 1 to 30% by weight, the ethylene-based polymer being an ethylene homopolymer or a random copolymer formed from ethylene and an α-olefin other than ethylene in which the α-olefin makes up not more than 10 mol % based on the total molar amount of the ethylene and the α-olefin, (D) a tackifier in an amount of 1 to 30% by weight, based on the total amount of Components (A), (B), (C) and (D), and, optionally (E) an ethylene/α-olefin random copolymer in an amount of 0 to 30% by weight based on the total amount of Components (A) to (D) and (E).

6. A laminate according to claim 5, wherein said adhesive composition comprising (A) a substantially linear, low-density polyethylene in an amount of 55 to 75% by weight, (B) a high pressure low-density polyethylene in an amount of 10 to 30% by weight, (C) an ethylene-based polymer modified with an unsaturated carboxylic acid, anhydride or ester thereof in an amount of 5 to 30% by weight, the ethylene-based polymer being an ethylene homopolymer or a random copolymer formed from ethylene and an α-olefin other than ethylene in which the α-olefin makes up not more than 10 mol % based on the total molar amount of the ethylene and the α-olefin, (D) a tackifier in an amount of 10 to 20% by weight, based on the total amount of Components (A), (B), (C) and (D).

7. A method for preparing a laminate comprising a layer of a saponification product of an ethylene/vinyl acetate copolymer and a layer of paper which method comprises adhering said layer of saponification product of ethylene/vinyl acetate copolymer to the paper layer by providing an adhesive composition layer therebetween.

wherein said adhesive composition comprising (A) a substantially linear, low-density polyethylene in an amount of 30 to 80% by weight, (B) a high pressure low-density polyethylene in an amount of 1 to 50% by weight, (C) an ethylene-based polymer modified with an unsaturated carboxylic acid, anhydride or ester thereof in an amount of 1 to 30% by weight, the ethylene-based polymer being an ethylene homopolymer or a random copolymer formed from ethylene and an α-olefin other than ethylene in which the α-olefin makes up not more than 10 mol % based on the total amount of the ethylene and the α-olefin, (D) a tackifier in an amount of 1 to 30% by weight, based on the total amount of Components (A), (B), (C) and (D), and, optionally (E) an ethylene/α-olefin random copolymer in an amount of 0 to 30% by weight based on the total amount of Components (A) to (D) and (E).

8. The method of preparing a laminate according to claim 7, wherein said adhesive composition comprising (A) a substantially linear, low-density polyethylene in an amount of 55 to 75% by weight, (B) a high pressure low-density polyethylene in an amount of 10 to 30% by weight, (C) an ethylene-based polymer modified with an unsaturated carboxylic acid, anhydride or ester thereof in an amount of 5 to 30% by weight, the ethylene-based polymer being an ethylene homopolymer or a random copolymer formed from ethylene and an α-olefin other than ethylene in which the α-olefin makes up not more than 10 mol % based on the total molar amount of the ethylene and the α-olefin, (D) a tackifier in an amount of 10 to 20% by weight, based on the total amount of Components (A), (B), (C) and (D).

* * * * *